Figure 1:
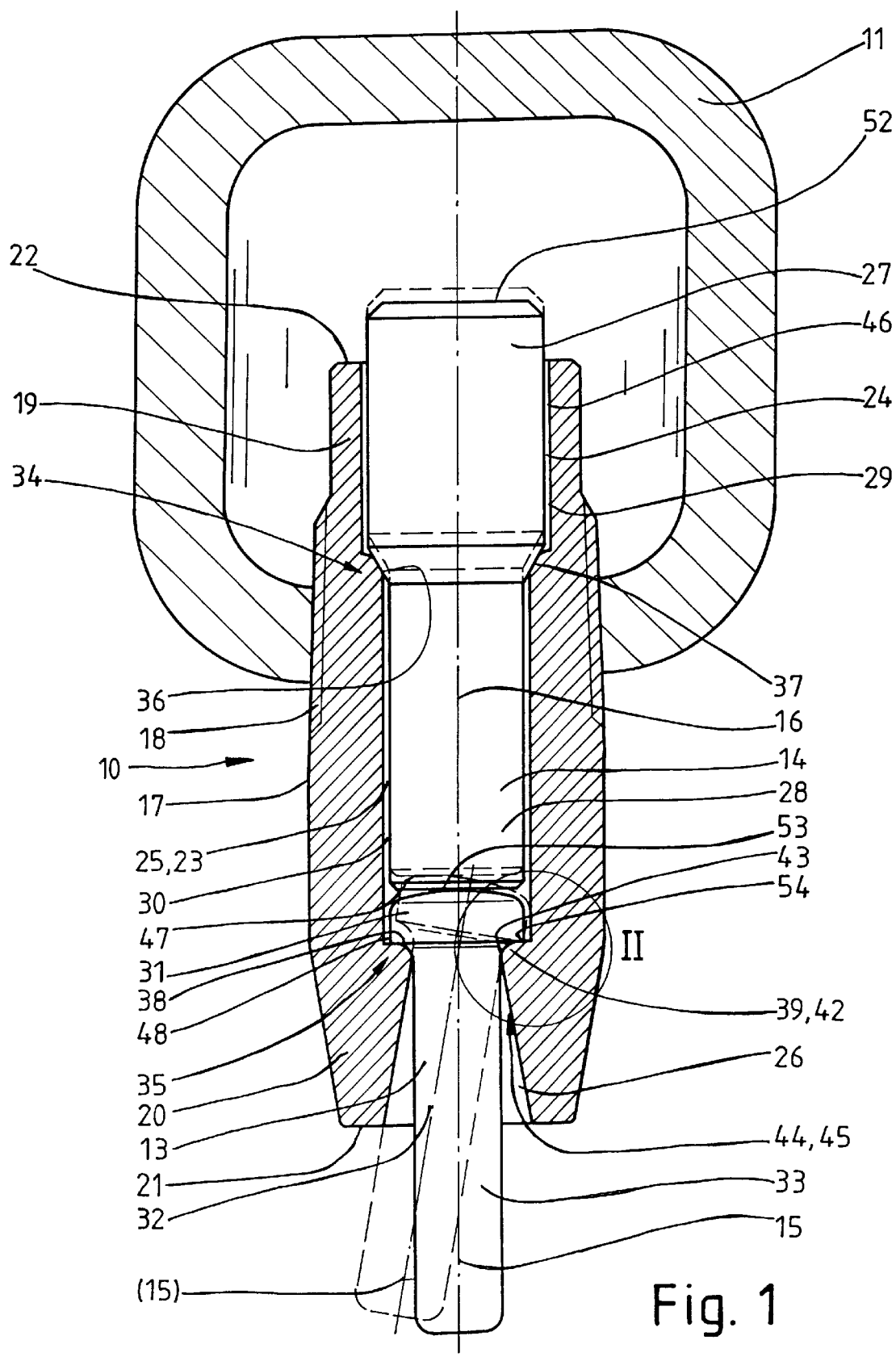

United States Patent [19]
Schumacher

[11] Patent Number: 6,073,584
[45] Date of Patent: Jun. 13, 2000

[54] WATERING VALVE

[75] Inventor: Egon Schumacher, Barnstorf, Germany

[73] Assignee: Lubing MaschinenfabrikL Ludwig Bening GmbH, Barnstorf, Germany

[21] Appl. No.: 09/047,852

[22] Filed: Mar. 25, 1998

[30] Foreign Application Priority Data

Mar. 26, 1997 [DE] Germany ............ 197 12 748

[51] Int. Cl.[7] ............................................. A01K 7/00
[52] U.S. Cl. ...................................................... 119/72
[58] Field of Search ............................ 119/72, 72.5, 75

[56] References Cited

U.S. PATENT DOCUMENTS

| | | | |
|---|---|---|---|
| 3,750,628 | 8/1973 | Schumacher | 119/72.5 |
| 3,750,706 | 8/1973 | Mallinson | 119/72.5 |
| 3,756,199 | 9/1973 | Clark, IV | 119/72.5 |
| 4,589,373 | 5/1986 | Hostetler et al. . | |
| 5,074,250 | 12/1991 | Clark, IV | 119/72.5 |
| 5,193,485 | 3/1993 | Hostetler | 119/72.5 |
| 5,327,853 | 7/1994 | Hostetler | 119/72.5 |
| 5,329,877 | 7/1994 | Schumacher | 119/72.5 |
| 5,522,346 | 6/1996 | Clark, IV | 119/72.5 |
| 5,628,278 | 5/1997 | Uri | 119/72.5 |

FOREIGN PATENT DOCUMENTS

| | | |
|---|---|---|
| 0332852 | 11/1989 | European Pat. Off. . |
| 1972753 | 8/1967 | Germany . |

Primary Examiner—Thomas Price
Attorney, Agent, or Firm—Technoprop Colton LLC

[57] ABSTRACT

Watering valves (10) allow animals to cover their water requirements on their own accord. Accordingly, the animals actuate an actuating section (33) of a valve pin (13), which projects from a housing (12) of the watering valve (10), by either tilting or pushing up on the valve pin (13). Smaller and weaker animals, in particular chicks, are often incapable of tilting the valve pin (13) far enough to open the watering valve (10). On the other hand, the watering valve (10) must close reliably when the respective animal no longer actuates it. Conventional watering valves (10) achieve this only through such means which make it more difficult to actuate the watering valve (10).

The watering valve according (10) to the invention has two valve seats (34, 35) in the interior of the housing (12). One valve seat each (34, 35) is assigned to the valve pin (13) as well as to an upper pin (14) arranged above the valve pin (13). In this manner, and in particular with the use of a raised head (31) of the valve pin (13), the requirements outlined above can be met by ensuring an easy actuation of the watering valve (10) and a reliable closing of the same.

32 Claims, 5 Drawing Sheets

WATERING VALVE

DESCRIPTION

The invention relates to a watering valve for small animals, especially chickens and chicks, according to the preamble of Claim 1, 7, 15 or 21.

Watering valves of the type under discussion here are conventionally employed in the large-scale keeping of preferably small animals, such as chicks or chickens. The watering valves enable the animals to cover their water requirement on their own accord. To do so, the animals open the watering valve by moving a valve pin with an actuating portion that projects from the lower housing of the watering valve. The watering valves close automatically as soon as the animal no longer maintains contact to the actuating end of the respective valve pin.

EP 0 332 852 A1 makes known a watering valve where an upper pin is arranged in the housing above the valve pin. The watering valve is opened by the respective animal exerting pressure on the actuating end of the valve pin or by raising the valve pin. Young animals, in particular chicks newly introduced into the coop, only have the strength to open the watering valve by tipping the valve pin. However, it has been demonstrated that not all chicks are capable of tipping the said watering valve to the point where it opens.

The watering valve known from EP 0 332 852 A1 is also provided, in addition to a valve seat of the valve pin in the housing, with another valve seat between the upper pin and the housing. The valve seat corresponding to the upper pin is located outside of the housing. Said valve seat is located directly in the flow of water provided by a water supply line into which the watering valve is partially attached. Thus impurities in the water may lodge directly into the valve seat. The result is that the valve seat between the housing and the upper pin no longer closes.

Against this background, the purpose of the invention is to provide a watering valve for small animals, in particular chicks, which can be easily opening and which closes reliably over an extended period of time.

The watering valve for solving this object exhibits the features set forth in Claim 1. Being configured in the housing between the upper pin and the housing, the valve seat remains protected from dirt and impurities. A flow restriction section is located between the upper pin and the housing above the valve seat. Dirt carried along by the water in the water supply pipe is retained by the flow restriction section.

According to a preferred development of the invention, the upper pin has a stepped configuration, namely having two portions of different diameter. The upper pin is provided with a sealing surface at the point were the different diameters of the upper pin run together. Likewise, the housing is stepped in the region of the upper pin, that is to say, provided with diameters of different sizes which correspond to the different diameters of the upper pin. A sealing surface is also located on the transition of these various diameters of the housing. The sealing surfaces on the housing, on one hand, and at the upper pin, on the other hand, together form the valve seat on the inner side of the watering valve. The corresponding, different diameters of the housing and upper pin form narrow gaps which only allow the entry of liquids, in particular water, yet hold back impurities. These circumferential gaps between the upper pin and the housing practically "filter" liquid entering the watering valve.

Another watering valve provided for achieving the objective of the invention exhibits the features of Claim 7. The arrangement by which a flow restriction system is located between the valve pin and the housing, compensates for any irregular dimensions between upper pin and the housing. The flow restriction section between the valve pin and the housing acts as a primary throttle, while a flow restriction section formed between the upper pin and the housing serves as a secondary throttle. This secondary throttle sets approximately the maximum water flow through watering valve. Due to dimensional tolerances between the upper pin and the housing, however, this maximum water flow may fluctuate more strongly than is the case with conventional watering valves having only one throttle between the upper pin and the housing, because the primary throttle between the valve pin and the housing restricts once more the flow of water already restricted by the upper pin, thus having to compensate only relatively minor fluctuations in the rate of flow (caused by deviations in dimensional tolerances between the upper pin and the housing).

According to a further development of the watering valve, a transition, shaped in the arc of a curve and running around completely, is arranged between a head and a shank of the valve pin. In particular in those cases when the housing is also curved at the point between the head and the stem of the valve pin, the curve makes it easier to tilt the valve pin because the valve pin can be slid into a tilted position.

Preferably, the curvature between the head and shank of the valve pin corresponds to the curvature in the housing in such a manner that a narrow gap is formed between the two curvatures. This gap allows for a non-constrained pivoting of the valve pin in the housing. But above all, the gap which runs all the way around between the curvatures of the valve pin on one hand, and of the housing on the other, at least when the watering valve is closed, serves to form at least one part of the flow restriction section between the valve pin and the housing.

A further watering valve for achieving an objective of the invention exhibits the features of Claim 15. Accordingly, the head of the valve pin is given a special form, namely it is provided with a raised or at least partially arched cover surface. Preferably, the upper side of the head facing the upper pin is raised or partially arched in form. As a result, the upper pin can be more easily raised at the raised or partially arched upper side of the head when the valve pin is tilted.

According to a preferred illustrated embodiment of the invention, the raised form of the upper cover surface of the head of the valve pin comes about through a rounded, circumferential edge region of the cover surface. This circumferential, rounded edge region of the cover surface encompasses a central, level circular surface whose diameter corresponds to approximately half the diameter of the head or less. This level surface ensures that the valve pin can be brought into a defined closing position in the non-actuated state of the upper pin and that this position can be arrested. Conversely, the curvature surrounding this flat surface serves to facilitate the pivoting of the valve pin, in that when the valve pin with the curved edge region is pivoted, the head makes contact with the preferably completely level underside of the upper pin, thus ensuring a smooth sliding action of the head of the valve pin under the upper pin.

The curvature of the ring area, which surrounds the centered level surface of the head and which provides the upper side of the head with a raised design, is preferably formed by areas differing in radius. Preferably, the cylindrical casing surface of the head is followed by a relatively smaller radius, which graduates into an essentially larger radius. In the preferred illustrative embodiment of the invention, the larger radius is at least ten times greater the smaller radius. The large and small radius verge into one another with no edge being formed. Likewise, the large radius runs out with no edge along the centered, flat surface of the head. This leads to a raised top side of the head with essentially no edges. Above all, the larger radius between the outer collar radius and the centered flat surface ensures that, when the valve pin is pivoted, the flat lower surface of the upper pin near the centered level surface comes to rest on the top side of the head of the valve pin, thus forming a short "lever arm" that allows the valve pin to be pivoted with very little actuating force. As the valve pin is further pivoted, the area of the lower side of the upper pin lying on the arched top side of the head of the valve pin slips further downwards along the large radius. Although this results in an steady increase of force required to pivot the valve pin, the upper pin is also lifted to an increasing degree, by which the volume of liquid exiting increases at a disproportionate rate. This ensures that large animals, who are capable of exerting a greater force to pivot the valve pin, obtain an increasing amount of water appropriate to their age.

A further watering valve for achieving the objective of the invention is shown by the features of Claim 21. Accordingly, the valve seat between the housing and the valve pin is designed in a special manner in that the sealing surface on the bottom side of the head of the valve pin runs in a radial direction relative to the latter and slightly inclined, and that the corresponding sealing surface at the housing runs at least partially in the radial direction in the same manner. The inclination of the sealing surfaces is circumferential, so that the sealing surfaces exhibit a plate-like form in whole or in part. The rotating inclined sealing surfaces lead to a centering of the valve pin when the animal lets go of the pivoted valve pin, which then returns to its initial vertical position. In the process, the longitudinal center line of the valve pin returns automatically to the longitudinal center line of the housing, thus ensuring a reliable closing of the watering valve in a non-actuated state.

According to an advantageous design of the invention, the head of the valve pin is sized so that its complete height (above everything) lies in the region of 0.3 to 0.5 of its radius. It has been shown that this sizing rule of the head makes it possible for even small chicks to open the watering valve by the lateral pivoting of the valve pin to an adequate degree, and that the watering valve automatically closes when the valve pin returns to its initial position that reliably closes the watering valve with partial support from the upper pin.

Also contemplated is having the diameter of the head of the valve pin dimensioned so that it is 1.4 to 1.6 greater than the diameter of the stem. These diameter ratios also facilitate the easy and sufficient opening of the watering valve while ensuring that the valve pin returns to its initial vertical position in order to close the watering valve reliable and tightly.

According to one preferred exemplary embodiment of the watering valve, the overall length of the upper pin is greater than the overall length of the valve pin. Preferably, the overall length of the upper pin is greater than that of the valve pin by a factor of 1.2 to 1.6. This ensures a sufficiently long flow restriction and filter section for keeping impurities in the water out of the watering valve, in particular at the valve seat inside the housing located between the upper pin and the housing.

The aforementioned properties of the watering valve according to the invention are additionally enhanced by a sealing surface on the upper pin, which is arranged along half the length of on the upper pin, which is arranged along half the length of the upper pin or above the halfway point of the length of the same, in particular in the region 0.5 to 0.7 of the length of upper pin (starting from its lower end). This ensures that the valve seat is positioned sufficiently deep within the housing in order to keep the watering valve and particularly the valve seat free of impurities in the water.

Finally, a space is provided between the valve seats at the upper pin and at the valve pin so that a narrow gap of 0.1 to 0.3 mm remains between the upper pin and the valve pin when the valve seats are closed. This arrangement ensures that both valve seats can close reliably and independently of the other in that the upper pin also rests with its entire weight on its valve seat. In addition, the valve pin can at first be pivoted extremely easily without abutting the upper pin until the rounded exterior edge region on the raised upper side of the head of the valve pin comes to rest on the flat underside of the upper pin; when the valve pin is further pivoted, the curvature of the edge region of its upper side can "roll off" beneath the upper pin.

Figure 2:
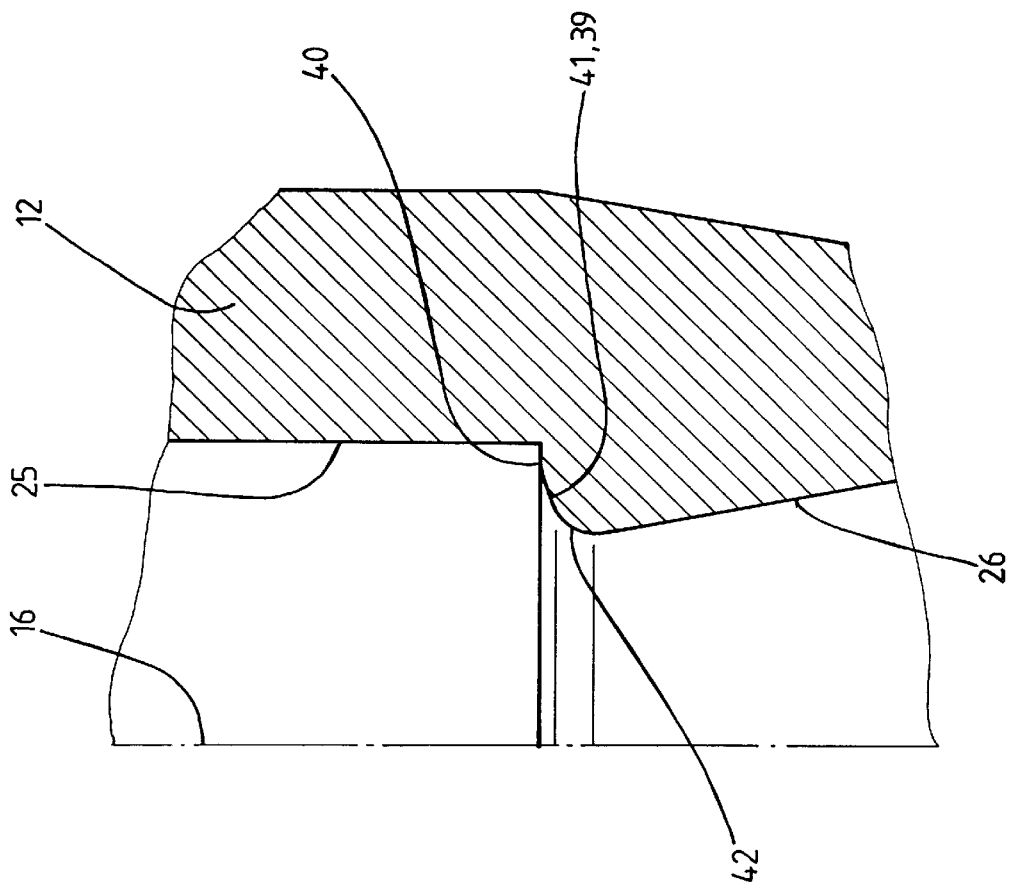
Figure 3:
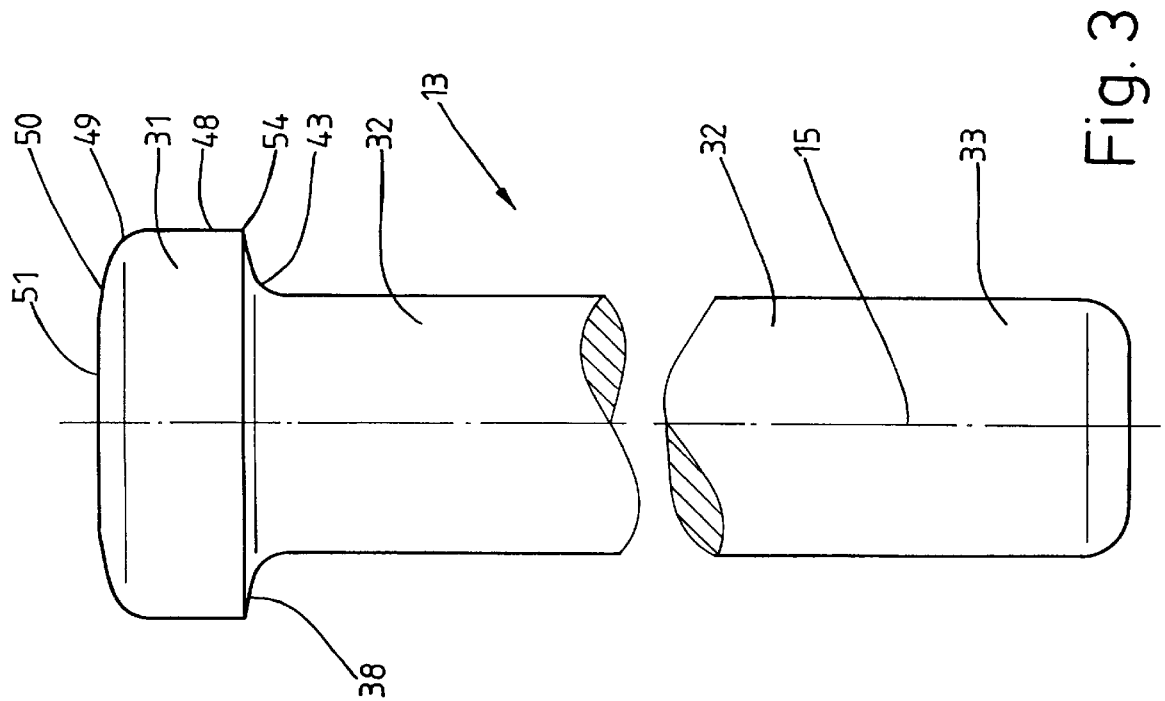
Figure 5:
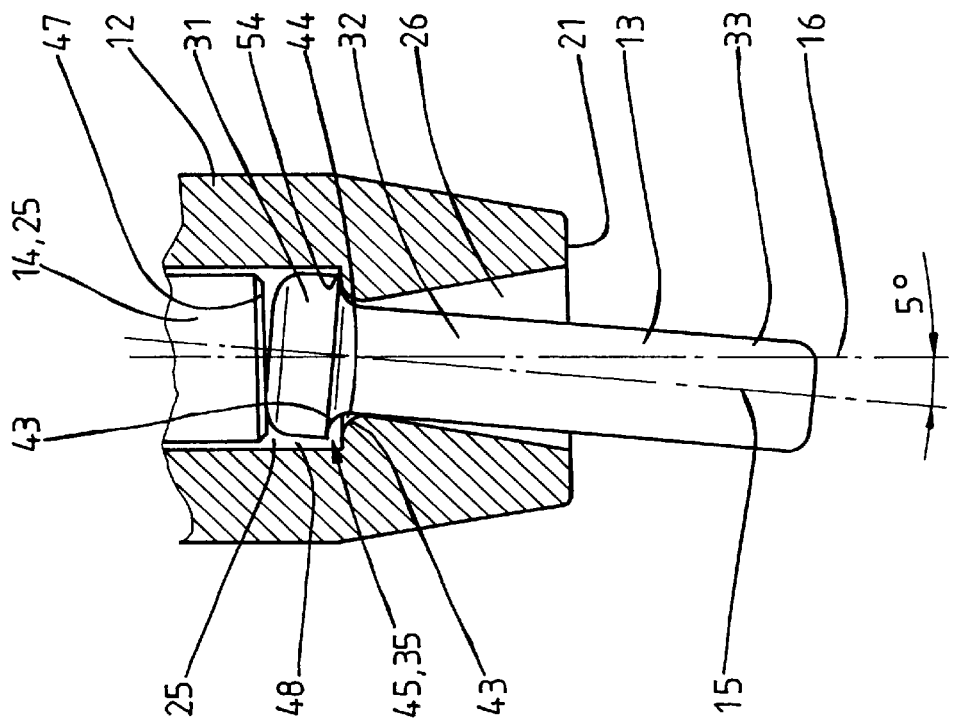
Figure 4:
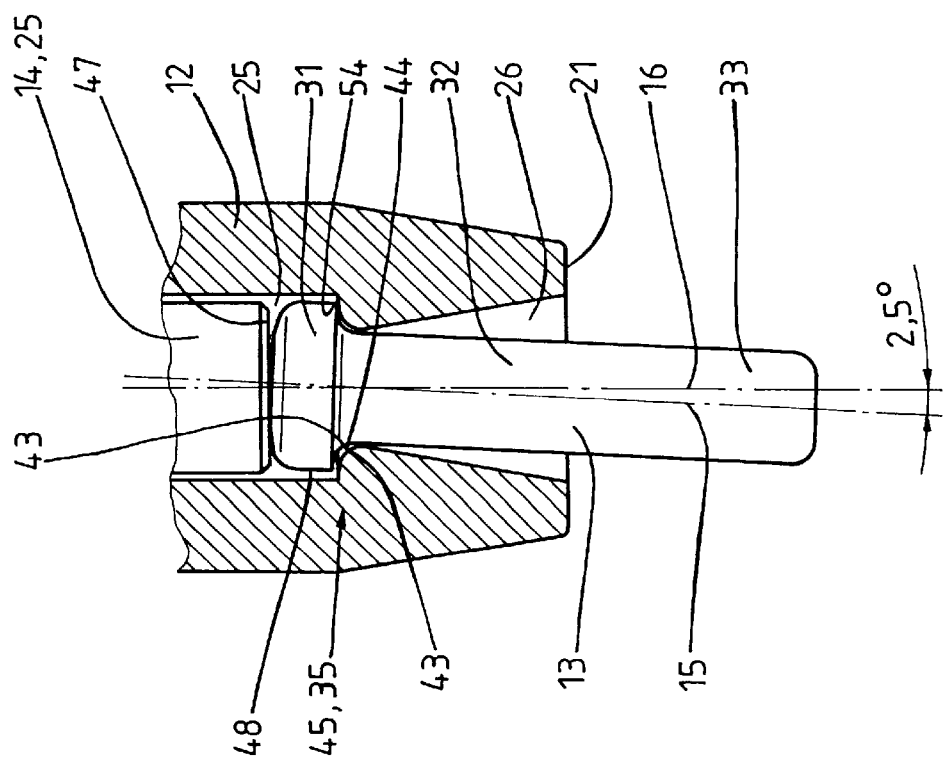
Figure 7:
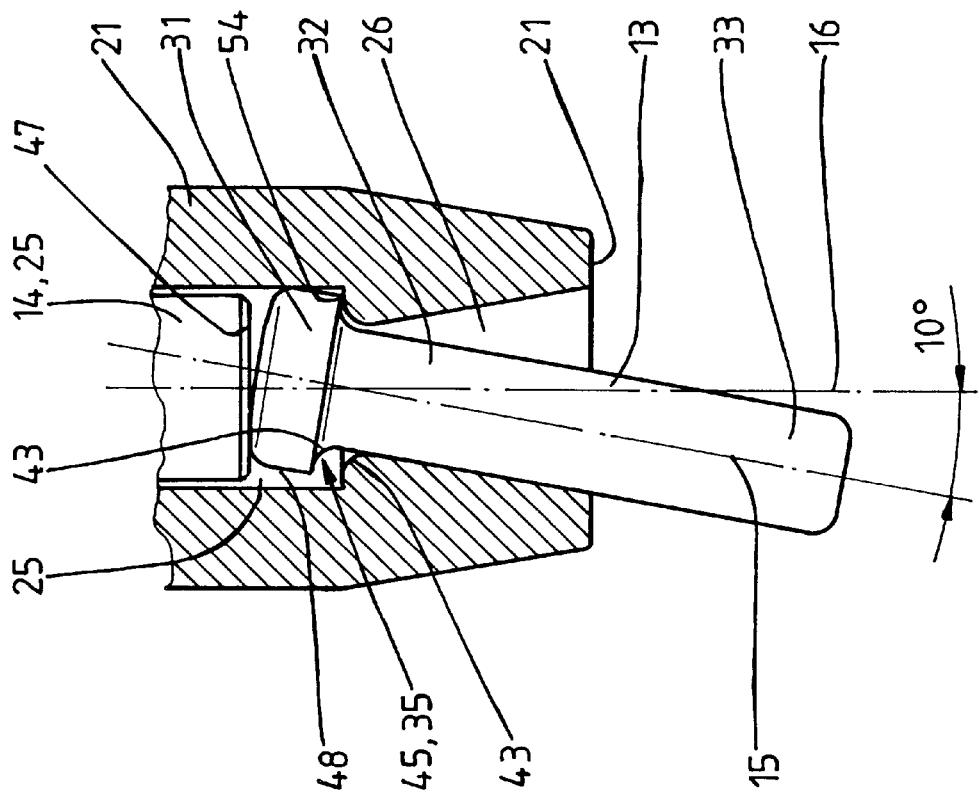
Figure 6:
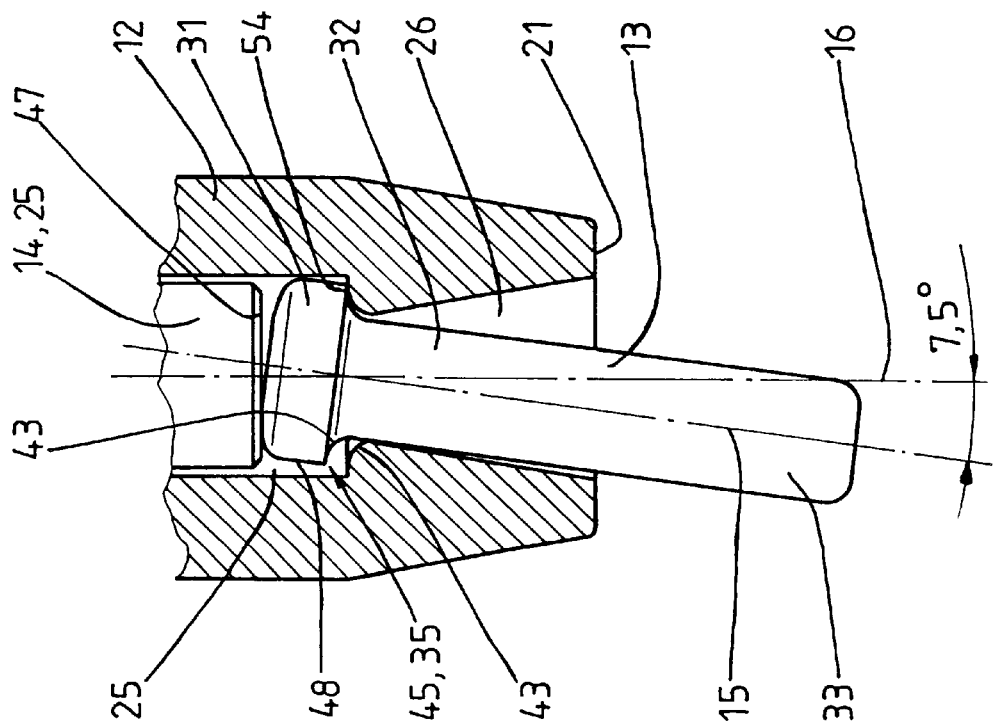
Figure 8:
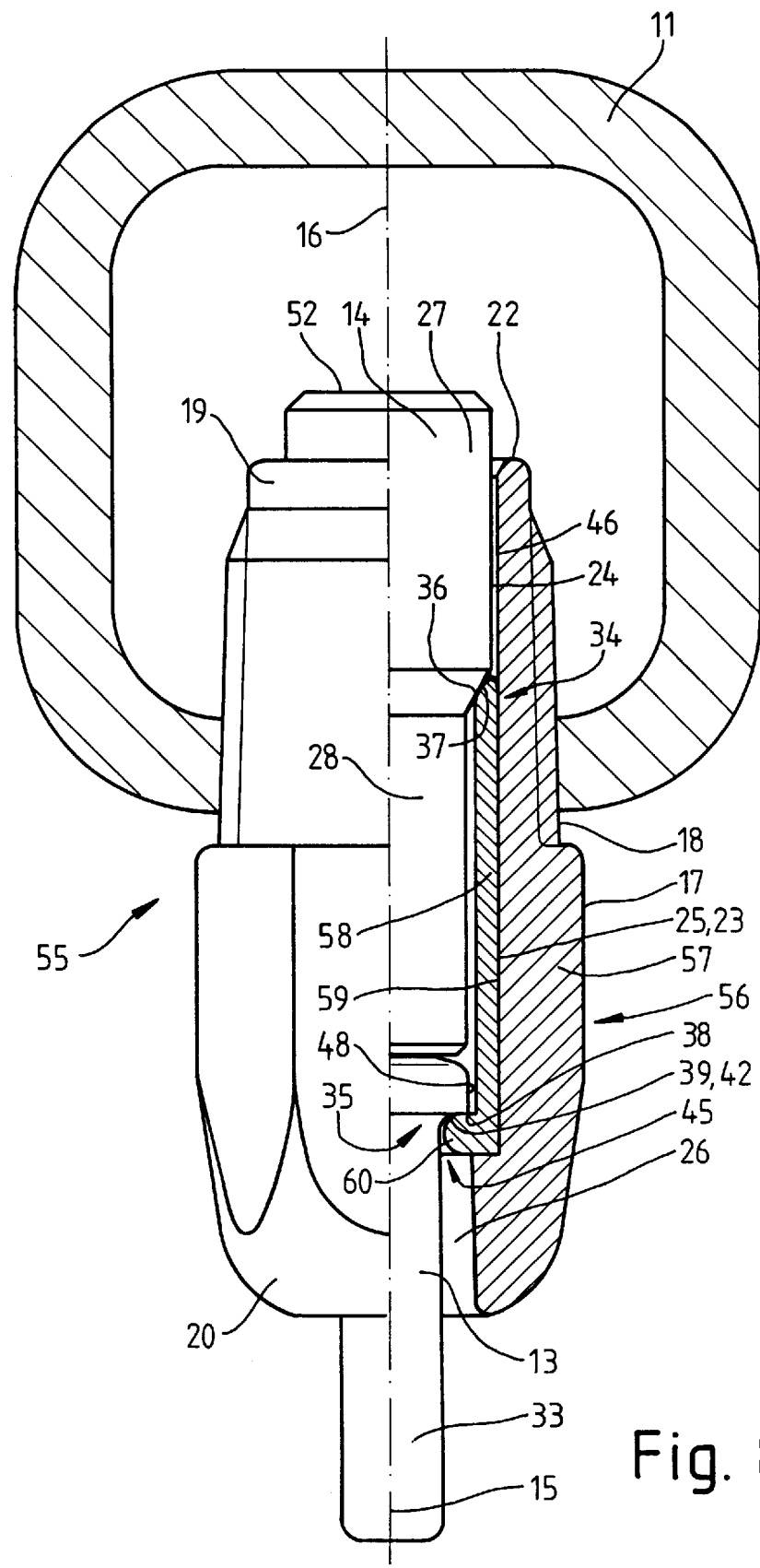

A preferred exemplary embodiment of the watering valve according to the invention will be explained in further detail below by means of the illustrations. These show:

FIG 1 a cross-section through watering valve screwed into a water supply line, on an enlarged scale, FIG. 2 further enlarged view of FIG. 1, with detail II of just a housing, FIG. 3 an enlarged valve pin in relation to the illustration shown in FIG. 1, FIG. 4 a lower part of the watering valve shown according to FIG. 1 with a valve pin pivoted by 2.5°, FIG. 5 an illustrated analogous to FIG. 4, with a valve pin pivoted by 5°, FIG. 6 an illustration analogous to FIG. 4, with a valve pin pivoted by 7.5°, FIG. 7 an illustration analogous to FIG. 4, with a valve pin pivoted by 10° (maximum), FIG. 8 a different exemplified embodiment of a watering valve, cut-away view.

The watering valves shown in the figures are primarily intended for providing livestock, above all poultry, with water. The use of the term water includes pure water, but can also mean a mixture of pure water and medicines, nutrients or the like. Use for poultry primarily involves young animals, namely broilers, which are introduced to the fattening batteries as chicks and raised. These animals, in particular the newly-introduced chicks, must be capable of opening the watering valve 10 far enough so that a certain amount of water is released per time unit.

Batteries are usually provided with a plurality of such watering valves. The watering valves are connected to each other at a distance from one another by one or more water supply lines 11. FIG. 1 shows the cross-section of a water supply line 11. This is a rectangular shaped pipe with rounded corners. However, different types of water supply lines could be used in this case, such as those having a round cross-section.

The watering valve 10 shown in FIGS. 1 to 7 exhibits a housing 12 in which a valve pin 13 and an upper pin 14 are arranged. The watering valve 10 thus comprises only the three named parts. The housing 12 as well as the valve pin 13 and the upper pin 14 are formed rotationally symmetrical in the circumferential aspect. All parts of the watering valve are made of metal, preferably stainless steel.

The upper pin 14 in the housing 12 can essentially be moved up and down only. On the other hand, the valve pin 13 in the housing can be moved up and down as well as pivoted in any direction from its mounted position (FIGS. 4 to 7). When the watering valve 10 is closed (FIG. 1), a longitudinal center line 15 of the valve pin 13 lies on a longitudinal center line of the watering valve 10. The longitudinal center line of the upper pin 14 always lies on the longitudinal center line 16 of the watering valve 10, which at the same time forms the longitudinal center line of the housing 12.

The housing 12 is provided with three sections along its outer circumference. A middle section 17 has a slightly conical configuration, tapering namely toward the water supply line 11. An upper end area of the middle section 17 is provide with an outer thread 16. This serves to screw the watering valve 10 into a correspondingly threaded bore on the lower side of the water supply line 11. Located above the middle section 17 is a constricted cylinder section 19 that lies within the part of the watering valve 10 screwed into the water supply line 11 and inside the water supply line 11 (FIG. 1).

Arranged below the middle section 17 is another conical end section 20, which tapers toward the bottom end of the watering valve 10. At the bottom end of the end section 20 the housing 12 is provided with a flat lower end face 21. The end located in the water supply line 11 at the opposite end of the housing 12 also has on cylinder section 19 an flat upper end face 22.

In the interior, the housing 12 exhibits a continuous bore 23 extending from the upper end face 22 to the lower end face 21. The continuous bore 23 is also provided with a plurality of sections. A large cylinder section 24 starts at the upper end face 22. Following that in the direction of the lower end face 21 is a smaller cylindrical section 25. This extends over a center region of the housing 12, at a distance from the lower end face 21 and the upper end face 22. Following the small cylinder section 25 in the direction of the lower end face 21 is a conical section 26. The conical section extends into the lower end face, continually widening from the small cylinder section 25 down to the lower end face 21.

The cylindrical upper pin 14 is graduated. Here the upper pin 14 has an upper cylinder section 27 whose diameter is larger than a cylinder section 28 located directly below it. The diameter of the upper cylinder section 27 of the upper pin 14 is slightly less than the diameter of the large cylinder section 24 in the housing 12. Likewise the diameter of the lower cylinder section 28 of the upper pin 14 is slightly less than the diameter of the small cylinder section 25 of the housing 12. In this way, a circumferential annular gap 29 is created between upper cylinder section 27 of the upper pin assigned to the large cylinder section 24 of the housing 12. A circumferential annular gap 30 likewise occurs between the small cylinder section 25 of the housing 12 and its associated lower cylinder section 28 of the upper pin 14. The annular gap 29 and the annular gap 30 preferably have the same width.

The valve pin 13 is provided with a head 31 and a stem 32 connected to the underside of the latter as a single piece. The head 31 of the valve pin 13 is located below the upper pin 14 in the lower end section of the small cylinder section 25 in the housing 12. The stem 32 extends through the conical section 26 of the housing 12 and has a length that is greater than the length of the conical section 26. Thus the stem 32 projects downward out of the housing beyond the lower end face 21 with a lower actuating section 33. This means that the lower actuating section 33 of the stem 32 is freely accessible for animals to pivot or press up on the valve pin 13.

The watering valve 10 has two valve seats 34 and 35. Both valve seats 34 and 35 are arranged at a distance from the upper end face 22 and the lower end face 21, respectively, of the housing 12. In this way the two valve seats 34 and 35 are located in the interior of the housing 12.

The upper valve seat 34 forms a primary seal between the upper pin 14 and the housing 12. The valve seat 34 has a frustoconical sealing surface 36 at the upper pin 14. The sealing surface 36 is formed by a corresponding frustoconical transition between the large upper cylinder section 27 and the small lower cylinder section 28 of the upper pin 14. A sealing surface corresponding to sealing surface 36 on the housing 12 is formed by a circumferential rounding. This rounding is located at the transition from the upper large cylinder section 24 to the small cylinder section 24 located below it in the continuous bore 23 of the housing 12 (FIG. 1). Due to the special design of the sealing surfaces 36 and 37, the upper pin 14 at the valve seat 34 is sealed from the housing 12 by a circumferential (circular-shaped) contact line.

The valve seat 35 between the valve pin 13 and the housing 12 forms a secondary seal having a sealing surface 38 on the bottom side of the head 31 of the valve pin 13 and a sealing surface 39 on the lower end of the small cylinder section 25 in the housing 12. The sealing surface is located on an annular section of the head 31 whose diameter is greater relative to the stem 32. The sealing surface 38 is circumferentially canted at approximately 10° proceeding from the outer circumference of the head 31 directed downwards to the longitudinal center axis 16 of the valve pin 13. The sealing surface 38 thus is thus provided with a circumferential plate-like shape (FIG. 3). The sealing surface 39 of the housing 12 is located at an annular constriction at the transition from the lower end of the small cylinder section 25 to the conical section 26. Next to the sealing surface 39 is an outer annular section 40 arranged in a plane running perpendicular to the longitudinal center axis 16 of the housing 12. The width of the outer annular section 40 of the sealing surface lies in the region between 0.2 and 0.3 mm. Preferably this width is 0.26 mm. The sealing surface 39 has an inner annular section 41, which abuts the interior edge of the outer annular section 40. The inner annular section 41 runs at an angle in the direction of the longitudinal center axis 16 of the housing 12 to the lower end face 21, specifically at an angle of 10° to the horizontal. The inner annular section 41 has, like the sealing surface 38, a plate-like shape under the head 31 of the valve pin 13, with the inner annular section 41 of the sealing surface 39 and the sealing surface 37 under the head 31 of the valve pin 39 having the same angle in order to form a ring-shaped bearing surface between the valve pin 13 and the housing 12 (FIG. 2). This plate-shaped bearing surface serves to seal the non-actuated valve pin 13 from the housing 12 at the valve seat 13 which forms the secondary seal. Due to the weak frustoconical or plate-shaped sealing surface 38 at the valve pin 13 and the partially corresponding, plate-shaped or slightly frustoconical sealing surface 39, the valve pin 13 is aligned centered to the housing 12 when the valve pin 13 returns from its pivoted position when the watering valve is open to its non-pivoted initial position that closes the watering valve. This aligns the longitudinal center axis 15 of the valve pin 13 with the longitudinal center axis 16 of the watering valve 10 and reliably closes the valve seat 35 between the valve pin 13 and the housing 12 (FIG. 1).

The transition of the sealing surface 39 for the valve seat 35 in the housing 12 to the subadjacent conical section 26 is formed by a circumferential rounding 42. This rounding 42 provides a smooth transition from the inner edge of the inner annular section 41 of the sealing surface 39 to the conical section 26. A rounding 43 corresponding to rounding 42 is provided between the head 31 and the stem 32 of the valve pin 13. This rounding 43 adjoins the plate-like sealing surface 38 at the underside of the head 31 and continues to the cylindrical stem 32. This also provides for a circumferential, non-stepped transition between the sealing surface 38 under the head 31 of the valve pin 13 and the stem 32. The radius of the rounding 42 is slightly greater than the radius of the rounding 43 at the valve pin 13. The difference in the radius dimensions of the roundings 42 and 43 is preferably about 0.1 mm. Furthermore, the circumferential rounding 42 is positioned at the transition between the small cylinder section 25 and the conical section 26 in such a way that the smallest diameter of the conical section 26 at the point of transition from the rounding 42 to the conical surface of the conical section 26 is slightly greater than the diameter of the cylindrical stem 32 of the valve pin 13. The difference in diameter is preferably between 0.2 and 0.5 mm. In the process, a circumferential annular gap 44 is formed between the roundings 42 and 43 that form at least a part of the primary throttle 45. This primary throttle 45, located between the housing 12 and the valve pin 13, is connected to the valve seat 35 in the direction of the lower end face 21 of the watering valve 10. If necessary, the primary throttle 45 can also be partially form by means of the valve seat 35. Furthermore, the greater diameter in the area of the rounding 42 of the housing 12 in relation to the rounding 43 at the valve pin 13 results in the valve pin 13 being pivotable in the housing 12 without any clampings.

A secondary throttle 46 is located between the upper pin 14 and the housing 12. In the process, the secondary throttle 46 is essentially formed by the annular gap 29 located above the valve seat 34 between the large cylinder section 24 of the housing 12 and the upper cylinder section 27 of the upper pin 14. If necessary, the secondary throttle 46 is continued in the annular gap 30 located below the valve seat 34 between the small cylinder section 25 of the housing 12 and the lower cylinder section 28 of the upper pin. The primary throttle 45 and the secondary throttle 46 result in that, in particular, tolerances in diameter of the upper pin 14 and/or of the housing 12, which could lead to different widths in the annular gaps 29 and 30, cause no significant change in the rate of flow of water through the watering valve 10. In addition, the annular gap 29 above the valve seat 34 keeps out any impurities carried by the water from entering the continuous bore 23 in the watering valve via the upper end face 22 of the housing 12. Thus, a "filtering" of the water practically takes place.

The top side of the head 31 of the valve pin 13 is also designed in a special manner. It is namely designed with a raised portion which is partially cambered toward the flat underside 47 of the upper pin 14. The cambering is created by a circumferential rounding 49 as an extension on the upper side of a cylindrical surface shell 49 of the head 31 and by a rounding 50 connected hereto in the direction of the longitudinal center axis 16 or the valve pin 13. This rounding, in turn, runs to a centered, flat circular surface 51 on the head 31. The outer rounding 49 proceeding from the cylindrical surface shell 48 of the head 31 has a radius which is many times less than the radius of the rounding 50 surrounding the flat circular surface 51. Preferably, the radius of the rounding 50 is approximately 50 times as large as the radius of the rounding 49. For example, if the radius of the rounding 50 were 10 mm, the radius of the smaller rounding 49 would then only be 0.5 mm. The diameter of the flat circular surface 51 is approximately half as large as the diameter of the head 31. Preferably, the diameter of the head 31 is approximately 4.5 mm, the diameter of the flat circular surface 51 is approximately 2.2 mm.

The height of the head corresponds to approximately the height of the stem 53 diameter, or is slightly larger, namely approximately 1.7 mm.

The overall length of the upper pin 14 is larger than the overall length of the valve pin 13. Preferably, the upper pin 14 is longer than the valve pin 13 by a factor of 1.3 to 1.4. If the valve pin 13 had an overall length of 14.5 mm, then the overall length of the upper pin 14 would be approximately 19.7 mm. The length of the stem 32 is measured so that up to approximately half of it is located in the approximately 6 mm long conical section 26, with the other part of the stem 32 having at least the same length, preferably a part up to 1 mm longer, projecting from the housing across from the lower end face 21, thus forming an actuating section 33 preferably 6.8 mm in length.

The large cylinder section 24 proceeding from the upper end face 22 of the housing 12 has a length less than that of the small cylinder section 25, including the sealing surface 37. Preferably, the length of the small cylinder section 25 is approximately double the length of the large cylinder section 24. For example, if the large cylinder section 24 were to have a length of approximately 6.5 mm, the small cylinder section 25 (including the sealing surface 37) would have a length of approximately 13 mm. Here the upper valve seat 34 lies approximately 6.5 mm below the upper end face 22 of the housing 12, while the lower valve seat 34 is located approximately 19.5 mm below the end face 22. The large cylinder section 24 of the upper pin 14 has a diameter approximately 1.3 times greater than that of the small cylinder section 25, which has a diameter of approximately 4.6 mm. The diameter of the large cylinder section 24 would then be approximately 6 mm.

The upper pin 14 projects with a short region of its cylinder section upwards out of the housing 12. When the watering valve 10 is closed, a flat upper side 52 of the upper pin 14 is located approximately 2 mm above the upper end face 22 of the housing 12.

If the two valve seats 34 and 35 are also closed with the watering valve is closed, the flat underside 47 of the upper pin 14 does not lie on the head 31 of the valve pin 13. Instead, when the watering valve 10 is closed, a small gap 53, preferably between 0.1 and 0.2 mm in size (FIG. 1), is located between the underside 47 the upper pin 14 and the flat circular area 51 on the head 31 of the valve pin. In this manner, the valve pin 13 can be tilted extremely easily up to an angle of 2.5°, until its head 31 makes contact with the underside 47 or the upper pin 14 (FIG. 4). this slight pivoting of the valve pin 13 can therefore be made without raising the upper pin 14. However, at the same time, the valve seat 35 between the valve pin 13 and the housing is thereby opened, so that liquid below the upper valve seat 34 can flow out of the watering valve 10.

FIGS. 4 to 7 illustrate the actuation of the watering valve with various lateral pressures being applied to tilt the valve pin 13. A valve pin 13 slightly tipped to approximately 2.5° from the vertical does not yet raise the upper pin 14; yet lower valve seat 35 is already slightly open and through which water located in the continuous bore 23 of the housing below the valve seat 34 can flow out of the watering valve 10. This ensures a slight supply of water to the animals at the slightest lateral pressure against the actuating section 33 of the valve pin 13 projecting out of the housing 12, but which results in only a limited amount of water being dispensed.

A further tipping of the valve pin 13 to an angle of 5° from the vertical results in an extended contact of the roundings 42 and 43. The edge 54 at the lower end of the cylindrical coating surface 48 of the head rests, in turn, on the outer annular section 40 at the underside of the small cylinder section 25 of the housing 12. The upper side of the head 31 thereby comes to rest on the flat underside 47 of the upper pin 14, which it raises slightly so that even the valve seat 34 between the housing 12 and the upper pin 14 also opens. Once both valve seats 34 and 35 are open, a continuous, uninterrupted flow of water issues from the watering valve 10. The pivoting of the valve pin 13 is facilitated in that, for lifting the upper pin 14, the rounded topside of the head 31 abuts the flat underside 47 of the upper pin 14 so that the rounding 50 having a larger radius moves on rolling contact on the flat underside 47 of the upper pin 14 (FIG. 5).

During further pivoting of the valve pin 13 to 7.5° from the vertical, another outer-lying region along the large radius of the rounding 50 on the upper side of the head 31 of the valve pin 13 comes to rest on the underside 47 of the upper pin 14. As a result, the upper pin 14 is raised further out of the housing, thus decreasing the length of the annular gaps 29 and 30. This also results in a reduced throttling length between the upper pin 14 and the housing 12 and thus to an increase flow rate of water from the watering valve 10 (FIG. 6).

A valve pin 13 pivoted to the maximum 10° from the vertical leads to a continued lifting of the upper pin 14 and to an even smaller restriction section between the upper pin 14 and the housing 12, with water being able to flow from the watering valve 10 at an even greater rate per time unit. The maximum 10° angle of pivot for the valve pin 13 is limited by the conical section 26, whose walls also run at an angle of less than 10° to the longitudinal center axis 15 of the housing 12. This results in an extended line of contact of the stem 32 of the valve pin 13 on the conical section 26 of the housing 12. This limitation of the maximal angle of pivot of the valve pin 13 is free of sharp edges which could cause wear and fatigue, particularly on the valve pin 13 (FIG. 7).

Whenever the respective animal lets go of the lower actuating section 33 of the valve pin 13 projecting from the housing 12, the watering valve 10 closes automatically in that the valve pin 13 falls back into its initial position, such that the longitudinal center axis 15 of the valve pin 13 overlaps the longitudinal center axis 16 of the watering valve 10. This return motion is initially supported by the weight of the upper pin 14. The flat underside 27 of the upper pin 17 presses against the flat circular surface 51 on the head shortly before the valve pin 13 reaches its vertical position. As soon as the valve seat 34 between the upper pin 14 and the housing 12 is closed, that is to say, the upper pin 14 has reached its lowest position, the valve pin 13 falls on its own accord due to its own weight back into its initial position, with the platelike sealing surfaces 37 and 38 of the valve seat 35 between the valve pin 13 and the housing 12 ensuring that the valve pin 13 is centrally aligned to the housing 12, so that the longitudinal center axis 15 of the valve pin 13 overlaps the longitudinal center axis 16 of the housing 12. The lower valve seat 35 between the valve pin 13 and the housing 12 is also shut in the process.

Larger animals can cover their greater water requirements by lifting the entire valve pin 13 with the upper pin 14. This causes the cylindrical coating surface 48 on the head of the valve pin 13 to come to rest with its full surface under the flat underside 47 of the upper pin 14, with the valve pin 13 being stabilized by the lifting movement and thus more difficult to pivot, which otherwise could make it more difficult to raise the valve pin 13 in the first place. By simply releasing the actuating section 33 of the valve pin 13, the valve pin 13 and the upper pin 14 return to their initial, lower position, with the respective valve seats 34 and 35 also closing in the process.

FIG. 8 shows a watering valve 55 according to an alternate exemplary embodiment of the invention. The watering valve 55 differs from the watering valve 10 only with respect to the design of the housing 56. The valve pin 13 and the upper pin 14 are have the same design as in the watering valve 10, which is why the same parts have been labeled with the same reference numbers.

The housing 56 is designed as two parts, namely comprising a housing base 57 and an insertion 58. The watering valve 56 thus comprises in essence four parts. The housing base 57 in the watering valve 55 is made of plastic. The insert 58, like the valve pin 13 and the upper pin 14, is made of metal, in particular of stainless steel.

The exterior of the housing base 57 is constructed in the same manner as the housing 12, so that matching parts have been labeled with the same reference numbers.

The housing base 57 has a cylinder section 59 proceeding from the upper end face 22. The cylinder section 59 runs continuously with no change of diameter to the lower conical section 26. The insert 58 is inserted in the cylinder section 59 of the housing base 57, preferably at a bias, so that the insert 58 is fixed clampwise in the housing base 57. The length of the insert 58 is shorter that that of the cylinder section 59. This results in a graduation inside the watering valve 55 that corresponds to the large cylinder section 24 and the small cylinder section of the watering valve 10. This results in the (upper) valve seat 34 between the upper pin 14 and the housing 56 at the upper end of the insert 58. For this end, the upper end of the insert 58 is rounded to from a sealing surface corresponding to the sealing surface 37 of the watering valve 10.

In order to form the lower valve seat 35, the insert 58 has a circumferential constriction 60 at its lower end whose inner ring surface is completely rounded and forms a sealing surface at its top side, which corresponds to sealing surface 39 of the watering valve 10. The watering valve 55 corresponds to watering valve 10 with respect to the valve seats 34 and 35 as well as to the primary throttle 45 and secondary throttle 46. Here, however, both valve seats 34 and 35 are formed by the metallic insert 58.

In order to keep the plastic housing base 57 free of damage when being screwed in and out of the water supply line 11, a lower section of the housing base 57 has external contact surfaces for a tool, in the exemplary embodiment shown as those for a hexagon.

What is claimed is:

1. Watering valve for small animals, in particular chickens and chicks, having a housing, a valve pin mounted in said housing and movable at least in an up and down direction, and an upper pin, arranged above the valve pin movable in an up and down direction, with a valve seat being arranged respectively between the housing and the upper pin, as well as between the housing and the valve pin, characterized in that the valve seat between the housing and the upper pin is arranged at a distance from an upper end face of the housing.

2. Watering valve according to claim 1, characterized in that the valve seat (34) between the housing (12) and the upper pin (14) opens by means of an upward movement of the upper pin (14) relative to the housing (12).

3. Watering valve according to claim 1, characterized in that the valve seat (34) is located in the region of different diameters of the upper pin (14) and of the housing (12).

4. Watering valve according to claim 3, characterized in that the upper pin (14) exhibits a frustoconical sealing surface (36) between its sections of various diameter.

5. Watering valve according to claim 3, characterized in that the housing (12) exhibits a circumferential, arch-shaped sealing surface (37) in the region of its sections of various diameter.

6. Watering valve according to claim 1, characterized in that the valve seats (34, 35) are spaced at a distance from one another so that when the sealing surfaces (34, 35) are closed, a narrow gap (53) remains between the underside (47) of the upper pin (14) and the head (31) of the valve pin (13).

7. Watering valve according to claim 6, characterized in that the narrow gap (53) measures 0.1 to 0.2 mm.

8. Watering valve according to claim 1, characterized in that an insert (58) is arranged in the housing (12) which exhibits the sealing surfaces (37, 39) of both valve seats (34, 35) on the housing side.

9. Watering valve for small animals, in particular for chickens and chicks, having a housing, a valve pin mounted in said housing both pivotably and movable in an up and down direction and which has a head and a stem, and an upper pin, arranged above the valve pin movable in an up and down direction, said valve pin projecting with a lower actuating section from a bore in the housing, characterized in that arranged between the valve pin and the housing is a flow restriction section which is formed from a first circumferential rounding between the head and the stem and a second circumferential rounding at one end of the bore located in the interior of the housing, with the center points of the radii of both roundings pointing to the same side.

10. Watering valve according to claim 9, characterized in that the housing (12) has a tapered bore for admitting at least one part of the stem (32) of the valve pin (13).

11. Watering valve according to claim 10, characterized in that the rounding (42) of the housing (12) and the rounding (43) at the valve pin (13) are correspondingly designed in such a manner that an annular gap (44) arises between the roundings (42, 43).

12. Watering valve according to claim 11, characterized in that the circumferential annular gap (44) between the roundings (42, 43) forms a flow restriction section.

13. Watering valve according to claim 9, characterized in that when the valve seats (34, 35) are closed, a narrow gap (53) is located between an upper side of the head (31) of the valve pin (13) and an underside (47) of the upper pin (14) in such a manner that the upper pin (14) does not come to rest on the valve pin (13) when the watering valve (13) is closed.

14. Watering valve according to claim 9, characterized in that the diameter of the head (31) is 1.4 to 1.6 times larger than the diameter of the stem (32).

15. Watering valve according to claim 9, oar characterized in that the overall length of the upper pin (14) is greater than the overall length of the valve pin (13).

16. Watering valve according to claim 9, characterized in that the sealing surface (36) at the upper pin (14) is located above the lower half-length of the upper pin (14).

17. Watering valve for small animals, preferably chickens and chicks, having a housing, a valve pin mounted in said housing both pivotably and movable up and down, and an upper pin, arranged above the valve pin and moveable up and down, with the valve pin having a head and a stem connected thereto, which projects out of the housing with a lower actuating section, characterized in that the head (31) has a cover surface that is at least partially raised.

18. Watering valve according to claim 17, characterized in that the cover surface of the head (31) has a centered, flat circular surface (51), whose diameter is less than that of the head (31).

19. Watering valve according to claim 18, characterized in that the region between the flat circular surface (51) and a cylindrical casing surface (48) of the head (31) is provided with a rounding.

20. Watering valve according to claim 19, characterized in that the rounding exhibits different radii around the flat circular surface (51) on the head (31).

21. Watering valve according to claim 20, characterized in that that the larger radius of the rounding (50) is many times greater in size than the small radius of the rounding (49).

22. Watering valve according to claim 19, characterized in that that the rounding (49), proceeding from the cylindrical casing surface (48) of the head (31), has a smaller radius that passes in a continuous and non-stepped manner over to a rounding (50) having a larger radius running up to the centered, flat circular surface (51) of the head (31).

23. Watering valve according to claim 17, characterized in that the diameter of the head (31) is 1.4 to 1.6 times larger than the diameter of the stem (32).

24. Watering valve according to claim 17, characterized in that the overall length of the upper pin (14) is greater than the overall length of the valve pin (13).

25. Watering valve according to claim 17, characterized in that the sealing surface (36) at the upper pin (14) is located above the lower half-length of the upper pin (14).

26. Watering valve for small animals, in particular chickens and chicks, having a housing, a valve pin mounted in said housing both pivotably and movable in an up and down direction, and an upper pin, arranged above the valve pin and movable in an up and down direction, with a valve seat being arranged at least between the valve pin and the housing, characterized in that a sealing surface which serves to form the valve seat at the valve pin is inclined in the radial direction of the valve pin at an angle 5° to 20° to the horizontal and that a corresponding sealing surface at the housing is inclined at least in part at an angle 5° to 20° to the horizontal.

27. Watering valve according to claim 26, characterized in that the inclination of the sealing surfaces (38, 39) toward the center of the valve pin (13) or of the housing (12) is directed downward.

28. Watering valve according to claim 26, characterized in that the overall height of the head (31) lies in the region of 0.3 to 0,5 of its diameter.

29. Watering valve according to claim 26, characterized in that the diameter of the head (31) is 1.4 to 1.6 times larger than the diameter of the stem (32).

30. Watering valve according to claim 26, characterized in that the overall length of the upper pin (14) is greater than the overall length of the valve pin (13).

31. Watering valve according to claim 26, characterized in that the sealing surface (36) at the upper pin (14) is located above the lower half-length of the upper pin (14).

32. Watering valve for small animals, in particular chickens and chicks, having a housing, a valve pin mounted in said housing and movable at least in an up and down direction, and an upper pin, arranged above the valve pin and movable in an up and down direction, with a valve seat being arranged respectively between the housing and the upper pin, as well as between the housing and the valve pin, characterized in that the upper pin exhibits sections of different diameter, with a sealing surface being arranged between the sections of different diameter, and that the sealing surface between the upper pin's sections of different diameter interacts with a valve seat arranged in the housing.

* * * * *